United States Patent
Hoy

(10) Patent No.: US 12,175,221 B2
(45) Date of Patent: *Dec. 24, 2024

(54) CODE-INDEPENDENT GRAPH TECHNOLOGY

(71) Applicant: Contrast, Inc., Albuquerque, NM (US)

(72) Inventor: Jason Hoy, Albuquerque, NM (US)

(73) Assignee: Contrast, Inc., Albuquerque, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/157,989

(22) Filed: Jan. 23, 2023

(65) Prior Publication Data

US 2023/0229405 A1 Jul. 20, 2023

Related U.S. Application Data

(63) Continuation of application No. 16/983,313, filed on Aug. 3, 2020, now Pat. No. 11,561,776.

(60) Provisional application No. 62/882,240, filed on Aug. 2, 2019.

(51) Int. Cl.
*G06F 8/41* (2018.01)
*G06F 16/901* (2019.01)

(52) U.S. Cl.
CPC .......... *G06F 8/433* (2013.01); *G06F 16/9024* (2019.01)

(58) Field of Classification Search
CPC .......................... G06F 8/433; G06F 16/9024
See application file for complete search history.

(56) References Cited

U.S. PATENT DOCUMENTS

| | | | | |
|---|---|---|---|---|
| 6,237,020 B1 * | 5/2001 | Leymann | ................ | G06F 8/61 709/201 |
| 11,301,295 B1 * | 4/2022 | Gupta | ................ | G06F 13/28 |
| 2014/0380291 A1 * | 12/2014 | Auerbach | ............. | G06F 30/327 717/156 |
| 2020/0195718 A1 * | 6/2020 | Nair | ........................ | H04L 67/63 |

\* cited by examiner

*Primary Examiner* — Ziaul A Chowdhury
(74) *Attorney, Agent, or Firm* — Sullivan & Worcester LLP; Thomas C. Meyers

(57) ABSTRACT

A computing environment of the invention comprises a graph structure, or multiple interconnected graph structures, the behavior of which is driven by data flow through interconnected nodes, independent of an external code base. The computer system may include a plurality of interconnected nodes in which data flow between the nodes drives execution of one or more functions and wherein code within the system is restricted to said nodes, each of which performs a dedicated function and an engine to drive communication between said system and operating hardware. Data are injected into a node and the node responds by outputting a value (data) to one or more subsequent nodes. Those nodes, in turn, output a behavior that is dependent upon the value (data) they received from one or more other nodes. Thus, it is the data that drives operation of the graph and not a traditional code stack.

12 Claims, 1 Drawing Sheet

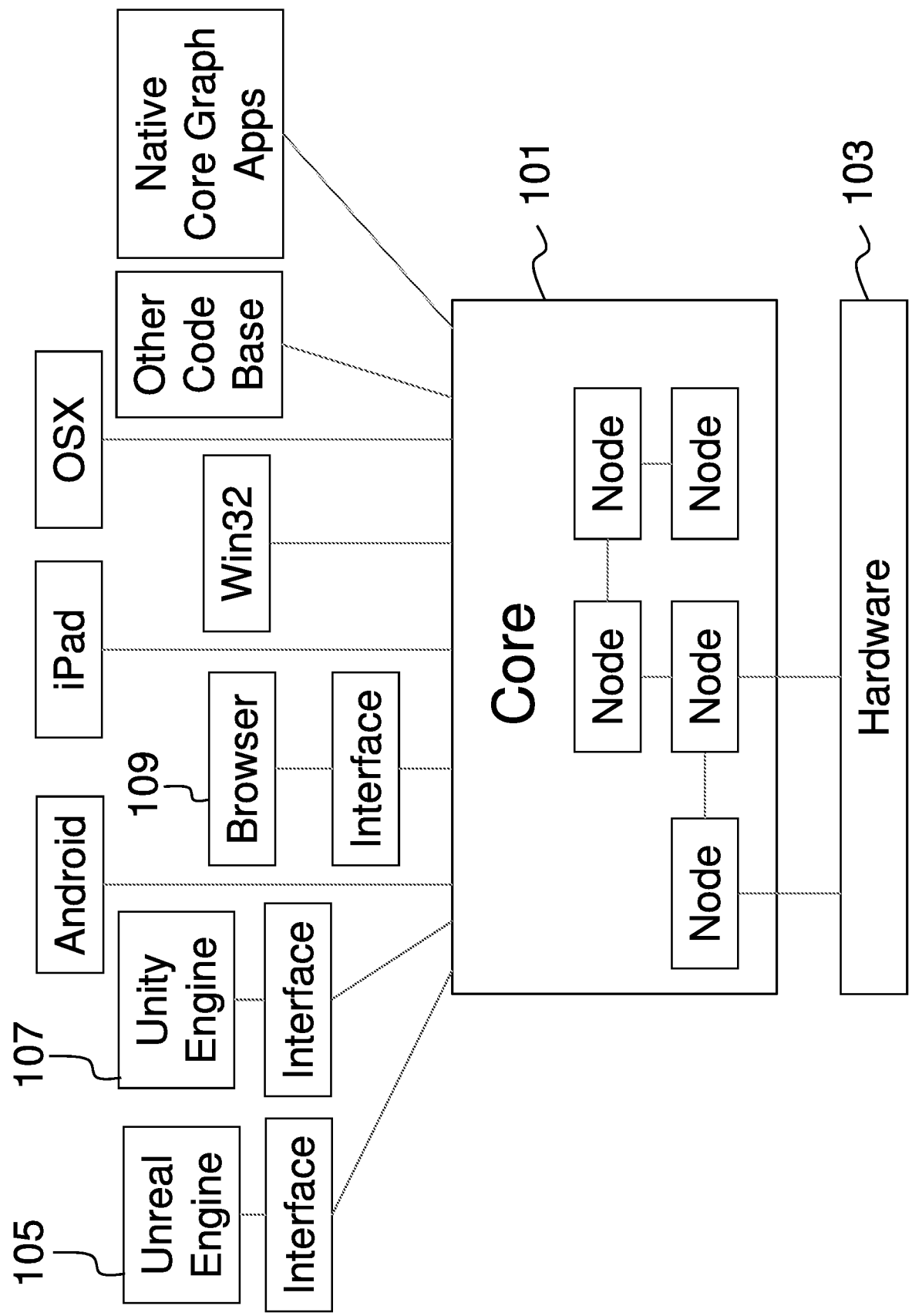

CODE-INDEPENDENT GRAPH TECHNOLOGY

TECHNICAL FIELD

The disclosure relates to computing systems and technology.

BACKGROUND

Traditional computing systems consist of thousands or even billions of lines of continuous code, often referred to as source code. The source code typically is transformed by a compiler into object code or machine language. In some coding environments, source code is run through an interpreter which converts the source code to an intermediate form which then executes a specified function. In either case, any code changes require a run-stop and recompiling of code once the changes are made. There typically is no effective way to continuously run a program while making changes to the functions performed by that program. In addition, code typically is not readily interchangeable so that a library in one language cannot simply be placed in an existing code base in another language.

Some advanced operating systems make use of a graph structure. A graph is a non-linear data structure consisting of nodes and edges or vertices. Nodes can connect to edges in a number of different ways and can be as simple or complex as desired for a particular application. Edges can be "directed" such that communication between the nodes flows in only one direction, or edges can be "undirected" in which communication can flow in either direction. Graphs have been used as a formal way to describe a network. In mathematical terms, a graph consists of ordered sets of pairs and is often represented by a set with nodes and edges expressed as G=(V,E), where V=(v1, v2 . . . ) and E=(e1, e2 . . . ). In computer operating systems, nodes are defined as ordered objects in the form of code. In a traditional graph structure, data are stored at the nodes, and edges connect nodes to each other. Graph structures are common in computer science and are used, for example, to model airline trafficking and social networks. The internet itself is a large graph. Traditional graph structures are represented in one of two common ways. The first is called an adjacency matrix. An adjacency matrix shows which nodes are connected to each other via one or more edges. Alternatively, vertices and edges in a graph structure can also be represented in an adjacency list. Additional specificity can be attained by weighting edges to indicate the importance of a particular connection or connections between nodes. In most graph structures, a code base is used to direct communication between nodes. Traditional graph-based structures rely on an external wall of code that drives execution within the graph. Thus, a traditional graph structure must access code in order to perform any actions specified by the code. The graph structure itself is unable to perform any useful action absent an external code base. The external code is typically composed of many thousands or millions of lines of code.

Regardless of the configuration of the graph, all traditional graph structures are driven by an external code base and require run-stops and compilers in the same way required by linear code. The external code base is what drives execution of graph behavior. Moreover, code in most graph structures is not modular and any change in a section of code must be compiled in order for the code to run. Thus, traditional code (whether in a graph structure or not) is not ideal for continuous function or modular code changes without interrupting run-stops and recompiling of code.

SUMMARY OF THE INVENTION

A computing environment of the invention comprises a graph structure, or multiple interconnected graph structures, the behavior of which is driven by data flow through interconnected nodes, independent of an external code base. Structurally, a graph of the invention comprises interconnected nodes which contain minimal code necessary to perform a defined operation and interface with the operating system and hardware on which the graph is run. Data are injected into a node (e.g., a query) by a user and the node responds by outputting a value (data) to one or more subsequent nodes. Those nodes, in turn, output a behavior that is dependent upon the value (data) they received from one or more other nodes. Thus, it is the data that drives operation of the graph and not a traditional code stack.

A graph structure of the invention is created independent of code. That is a distinguishing feature from traditional visual programming applications. In traditional applications, the visual programming tools are the representations of underlying code that must be written first. That code, in the form of visual programming tools, can then be applied to a graph structure that essentially runs the compiled code. In contrast, a graph of the invention is prepared independent of any code. In fact, code is not needed at all in order to prepare a graph of the invention. The only code that is ever needed is added in nodes after preparation of the graph structure in order to enable the graph to "talk" to a selected operating system and associated hardware.

Thus, code only exists in nodes and is minimal, with each node performing a specified behavior. The code that is placed in a node is only there to allow a connection to the operating system and hardware on which one desires to run the graph. Accordingly, there is no underlying code running the graph. Rather, the graph is run via the flow of values (data) between nodes, with the minimal code there only as a translator into a selected operating system. In a graph structure of the invention, a behavior is the output of one or more nodes based on values (data) received by those nodes. A platform of the invention is therefore easily ported to Java, iOS, Linux, and android operating systems (among others).

Unlike a traditional graph structure, a graph of the invention requires no application-specific logic and there is no need to compile any code on an application level. In fact, there is no application-specific code at all. The minimal code that exists in nodes is simply there in order to access a given operating system. Outside of that, the graph runs independent of code via the flow of data through nodes. Thus, the graph structure can be ported to any environment that is desired. In addition, while traditional code is context free, a graph structure of the invention is dependent on context. Graph structures of the invention can, therefore, handle massively asynchronous information. For example, nodes in systems of the invention can monitor actions of other nodes while simultaneously performing a dedicated behavior.

In the context of the invention, a node performs a behavior that can be as simple as storing a library of values or outputting the results of a calculation. Nodes communicate via values (data) that flow between them. Within the graph structure, nodes are organized in a hierarchy that drives the flow of values between the nodes and other graph structures. The hierarchical nature of the structure allows for a variety of interoperative connections and connectivity between graphs, which results in efficient operation with minimal compiled code.

An exemplary system according to the invention comprises a graph structure in which execution is driven by data flow through the graph structure without a code stack to drive execution or run compilers as required in traditional code-based computing. A system of the invention is not a run time interpreter. The system creates and connects specified graphs on startup and after that data flow drives execution. The underlying system simply maintains the namespace of properties in the system. Computing within the system is accomplished by specifying how pieces of the system connect, thus specifying how data flows through the system. It is that data flow between nodes that results in automated state changes to information. Thus, the invention is distinct from a traditional visual programming tool because, for example, systems of the invention do not simply wire together function calls. Instead, systems of the invention operate on the basis of information management in which data flow between nodes drives execution of one or more functions.

As a result of the architecture of systems of the invention, there is need for only minimal code in the nodes and no driving code base that needs to access the graph as occurs in traditional graph technology. A typical node has a single function, but may have a small number of related functions. In any case, there is minimal code in each node, which results in the modular nature of systems of the invention. If there is a need to change the flow between nodes (the structure of the graph), there is no need to perform a run stop function, and function changes can be made "on the fly" without the necessity to halt the system. Changes are automatically propagated throughout the system.

A node is an object that supports units of code that can be, for example, libraries or executables. Nodes are placed into a hierarchy that produces behaviors. Each node "listens" to values (i.e., data) transmitted from other nodes and responds as appropriate based upon input values it receives. When a node receives a value from another node, the receiving node modifies itself based upon its code features in respect of the value that is inputted from one or more other nodes. Nodes are hierarchical and are linked so that values automatically flow between nodes in the hierarchy. A graph can operate in an asynchronous, multi-threaded manner by setting up the hierarchy of nodes to respond to incoming values as opposed to a sequence of function calls as is the case with most traditional programming environments. If desired, functionality in a graph can be isolated from the main thread of connections. For example, a large database or a security protocol attached to a list can be isolated and implemented separate from an implemented hierarchy (e.g., by pointing to a separate but connected graph).

A graph structure according to the invention may comprise one or more folders, each of which can contain one or more nodes. Folders can also be used as placeholders for future nodes. A collection of nodes can be used to define a "state". The state properties of a graph change together as data (values) flow between the nodes. Graph structures also have a temporal aspect, which allows for the ability to look at identified paths and to determine temporal information (i.e., when and how a state property came to be). Thus, a graph structure of the invention allows a readily available and accurate look back at the inputs to nodes over multiple pathways. Finally, the flow between nodes in a graph structure according to the invention is amenable to live editing and debugging. Thus, real-time changes can be made to the flow between nodes (that is, the structure of the graph) while the program is running and without the need for recompiling or run-time stops.

Systems of the invention are applicable to a wide range of computing problems and systems. For example, a system of the invention is useful as an operating system that integrates with any file format or display technology. Thus, the invention is applicable in any computing application or environment. It is an operating system that can be used to advantage for myriad applications. One particular application is the processing of audio and/or video files. As described herein, systems of the invention are useful for the preparation and transmission of real-time video files, such as high-dynamic-range (HDR) video as described in U.S. Pat. No. 10,257,393, incorporated by reference herein. The skilled artisan will recognize numerous additional applications.

A construct of the invention comprises an engine that has the ability to read graph definitions and to construct the required node objects and connect them. The invention also comprises a cataloging system that allows dynamic loading of code/objects at run-time utilizing operating system specific mechanisms (e.g., DLLs on Windows). A system of the invention allows values to be placed anywhere in the namespace of the core and to be distributed to all nodes that are listening to the core at any given time.

In one embodiment, as described below, the invention contemplates a temporal aspect such that it enables persistence/storage of values flowing through the system. That enables one to retrieve paths through which data flowed over any time period, past or present. Also, any time a path is instanced, values (data) that were previously recorded are injected back into the path. The temporal aspect of the invention assigns a sequence number to each path and value that is recorded in the system. That allows for "causality" to be maintained in the system but keeps the system independent of time. In addition, values (data) can be transferred between temporal databases in the system by "playing back" recorded values into a new database. That allows for generic information transfer between systems, regardless of the application. Special queries for the temporal instance of the invention can be constructed for any arbitrary recorded path that limit the range of values from one path so that the recorded values from another path can be inspected that "happened" at the same time as the constraints. This also allows for automatic "review systems" for applications that allow the user to step through the recorded sequence numbers to observe how values evolved over time. Temporal implementation is kept very simple to allow for running in embedded systems with limited storage and to avoid the time cost associated with using "traditional" databases which are not suited for storing arbitrary temporalized data. Reviewing state graphs from the "past" are linked to current state graphs and 'linked' in the same way other graphs are linked to provide a "feed" of temporal data to the current state. This makes it easier to review an entire collection of values.

With respect to web development, in traditional "web enabled" applications one must write code to compile with whatever arbitrary API that a chosen web server might provide. One has to 'write code' to 'produce' the desired web page that is delivered to the user. There are many levels of protocols and toolsets required in order to interface to an application. Most "applications" have to be designed knowing ahead of time it is going to 'feed' a web browser, that is no other user interface is planned or can occur. This generally means the 'logic' of the application is tied up with the code required to communicate with the web server. It is another example of a whole different level of effort required to 'support' a web interface. Additionally even once the HTML page has been generated there is a lot of code that must be written on the client side (i.e. JavaScript, etc. using Node.js, Angular etc.) which is a larger code base to do 'client side' things inside the browser.

As one can imagine, writing a large web application from the ground up using typical programming methods is quite the undertaking in terms of manpower and 'lines of code' required not to mention the code required to actually write the application logic. In the invention, a developer can simply write the application in graphs as it should run and then "after the fact" decide what type of user interfaces are needed/required, thereby drastically reducing the manpower required to achieve the same result. Thus, a web browser is just another 'namespace client', that is a computing entity that can connect and use the standard core API (load, store listen) to receive and transmit state changes to and from the namespace. This allows a direct connection to the namespace and bypasses numerous layers of software written in code. This also means that multiple "types" of user interfaces can be used simultaneously on the same running namespace. This has the consequence that changes to one user interface are reflected in real-time to all others regardless of type. As a specific example, a user clicking on a checkbox on an HTML page immediately and automatically "checks" that same box for the user interfacing to the system using a "native" OS X or Windows application on other computers. Another specific example is that multiple people using multiple browsers navigated to the same "HTML page" will immediately see any state changes by any other user reflected in their browser. This is because all those user controls "point" to the same namespace location so any changes to a particular value are reflected to all listeners (web browsers, applications logic, other namespaces, etc.).

In the case of HTML specifically there exists a Javascript script that enables communication between a remote namespace to the local browser over the standardized "web socket" protocol. In systems of the invention there is a 'transport layer' that supports web socket interfacing to support external web clients accessing the namespace (just as there are TCP/IP, UDP, serial, etc. transport layers as well). HTML elements can be 'flagged' as core elements by including a special tag that specifies the namespace path that will be assigned to the user interface element. As the namespace changes, and updates are sent to all listeners, the new values are interpreted according to the element type (button, checkbox, etc.) and that element is updated to reflect the 'value' that has been received.

Additional applications of systems of the invention are numerous and include any application in which a conventional operating system would be appropriate, including but not limited to audio, video, data processing, word processing and others.

BRIEF DESCRIPTION OF THE DRAWINGS

FIG. 1 is a diagram of a system of certain embodiments of the disclosure.

DETAILED DESCRIPTION

The invention provides computer architecture comprising a graph structure containing nodes that have values (data) flowing between them that drive execution. A system of the invention is analogous to glue logic that allows interoperability of small code modules and/or legacy systems in a computer-language-independent manner. Systems of the invention differ from a traditional programming environment that allows a user to wire together function calls. Rather, systems of the invention represent a data management system in which data flow drives execution. This means that systems of the invention create and connect specified graphs on startup and then allow data flow to drive execution. Systems of the invention specify how pieces of the system interconnect, thus specifying how data flows through the system. Accordingly, there is no need for a code base to access and control graph function. Rather, the minimal code that exists in nodes is simply there to allow interface with an operating system and/or associated hardware.

In traditional "web enabled" applications, one must write code to comply with whatever application programming interface (API) the web server provides. Thus, one must write code to produce a web page that one desires to push out to users. Most applications have to be designed specifically to feed into whatever web browser will eventually be used. No other interface is planned or can even occur. Once the hypertext markup language (HTML) page is generated, there is still a significant amount of code that must be written on the client side (e.g., JavaScript, etc.). To the contrary, in systems of the invention, a developer can simply write the application in graph structures as it should be run and then later decide what type of user interfaces are needed or required. This drastically reduces the code footprint and the amount of time a developer must spend to integrate a new application in a web environment. According to the invention, a web browser is simply another client that is integrated with the core of the graph structure(s). This results in a direct connection to the core and allows one to bypass numerous layers of code normally required to integrate an application in a web environment. The invention also allows multiple "types" of user interfaces to be run simultaneously. This has the consequence that changes to one user interface are reflected in real time to all other users, regardless of the format.

Systems of the invention are implemented in a platform-independent manner that is not tied to any particular language or computing environment. Thus systems of the invention do not require code rewrites for new hardware or operating system platforms. There is also no need to port source code into a new language for use in a system of the invention (i.e., it will run as is). A developer utilizing a system of the invention does not need to create multiple threads of execution and synchronize data between those threads. Rather, threads are created on demand, implied by the use of certain node functionality (such as timers or socket input/output (I/O) availability detection). Asynchronous/multithreaded operation naturally occurs by simply setting up the hierarchy to "react" to incoming events rather than a sequence of function calls as occurs in traditional code-based programming. Portions of the functionality of a system of the invention can be isolated and implemented separately from application logic. This allows the main part of the logic to remain separate from other, unrelated, functionality.

Systems of the invention utilize a small code footprint that exists only in nodes, regardless of the size of the ultimate application. The invention allows completely modular programming in which language-compatibility is not a barrier. Systems of the invention comprise a hierarchical data structure. At a top level, a graph comprises files that contain nodes. The nodes contain minimal code and are connected in a graph structure at the convenience of the user. Some nodes may remain empty for future use. Nodes are connected by values. A value is a single element, such as an integer, floating point number or an object (e.g., "4", "5.6", or "George"). Values are transmitted between nodes. In turn, nodes 'listen' to values stored in other nodes. Nodes essentially are objects that support a dictionary interface. Nodes are generally placed into hierarchies that communicate values between them. Once in a hierarchy, keys for various nodes are linked to keys in other nodes so that values can automatically flow between nodes in the hierarchy. The hierarchy of nodes reacts to input through a series of linked communications rather than a sequence of function calls as is typical in traditional code structure. As is apparent from the structure of a system of the invention, large pieces of functionality (e.g., databases) can be isolated and implemented separate from the hierarchy as a whole. That leads to both modularity in the design of the system and the ability to modify pieces (e.g., nodes) without shutting down the entire hierarchy. Thus, changes to the graph structure (and therefore changes to the function of the system) are made in real-time without the necessity for standard compile/download/reboot cycles typical in traditional software development.

Numerous advantages of systems of the invention are apparent to the skilled artisan upon consideration of the present disclosure. For example, systems of the invention allow one-time implementation of solutions independent of language, operating system, or environment. There is no need to rewrite code for any new hardware or operating system platform. In other words, there is no need to 'port' source code that already works into a new language, possibly introducing new bugs, for use in systems of the invention. The structure of the invention also allows for easier and faster startup of new hardware and/or software platforms. Since 'solutions' are written in graphs, any previously-generated code can be ported in on a modular basis and will run in the graph hierarchy. In systems of the invention, a developer does not have to create multiple threads of execution and synchronization of data between those threads (race conditions, etc.). Instead, threads are created 'on demand' implied by the use of certain node functionality (such as timers or socket I/O availability detection). This allows the creation of threads or an equivalent structure needed for the environment (such as message passing) without the developer having to worry about the details or capabilities of the underlying environment. Instead of requiring an independent development effort to write additional code to implement security, the operating namespace in a graph of the invention is secured independent of the graph, similar to setting the permissions on directories and files in a file system. Systems of the invention also benefit from increased ease of use. For example, a single API can be used for retrieving or modifying anything in the namespace using the simple commands of load, store and listen for any environment. This allows for 'after the fact' integration of implementation solutions once the main application is complete. A remote namespace can connect up and use an existing solution namespace in previously unexpected ways without having to modify the existing solution namespace. This also leads to single implementation for any communications between namespaces/computers over any interface, such as a network. Since any data can be sent to and from a namespace using the same 'pipe', all inter—and intra-computer communication works the same way by 'sharing' the same location in the namespace (similar to sharing 'folders' in Windows or OSX). This allows multi-computer solutions to be more easily written and synchronized via implementation states.

Systems of the invention necessarily require a relatively small code footprint, regardless of the ultimate size of the application. This means less actual compiled code running which means fewer code bugs that result in buffer overruns, etc. Since about 99% of development effort in the current invention is in creating the graphs, there is little-to-no new 'code' being written that would introduce new 'crash' bugs. This also localizes changes or errors introduced into the system into the area of the namespace that is being modified. Bugs that cause 'crashes' in traditional programming are transformed into bugs that simply do not reflect the desired behavior of the system; but there is no disruption of the underlying system. Utilizing the temporal aspect of systems of the invention, a developer can trivially set a graph so that it automatically produces a history record of changes made to the library of solutions. This temporal storage is also available to the graphs for storage of any data in the system and is a straightforward way to enable 'storage' in an application again without having to write additional logic either in code or in graphs. Data are stored relative to their emission location within the namespace which also allows easier 'discovery' of available data via a file system like browser. Previous points in time can be brought up to 'now' in order to restore previous solutions and/or data. Thus, a user can query for temporal/history data inside graph solutions in order to enable visualization tools or any other logic that requires a look back in time.

Systems of the invention also create a 'portal' that allows for transparent 'linking' of namespaces across processes, machines, or any communication method. Properly written graphs can implement solutions that can automatically take advantage of this feature without needing to worry about the details of communication or the actual location of shared data. Systems described herein also operate well as 'glue' in order to interface to legacy systems and bring the information in those systems into the inventive graph structure. In fact, entire solutions can be written in a graph structure of the invention for the sole purpose of integrating disparate legacy systems in a language and environment independent way. New solutions can be implemented that give legacy systems 'new' functionality in a modern environment. Display systems of the invention are completely separated into layers to minimize dependencies of solutions to the eventual user output. A general 2D and 3D graph renderer is available that is then further separated from the actual display output using toolkits such as OpenGL, GDI, etc. Such display systems allow multiple clients and multiple namespaces to connect to the same visuals. This allows any number of displays with different format to render the same visual logic. Graph render separation also allows the developer to 'choose' which computer the actual 'heavy lifting' of the visual logic will run on while leaving the 'lightweight' computers to only worry about actual display output.

A generalized system of the invention is presented in FIG. 1. As shown, a core comprising one or more graphs comprising interconnected nodes 101 is connected to the hardware 103 on which the namespace is running. The core 101 receives input from one or more of a plurality of sources. Shown in FIG. 1 are the Unreal Engine 105, the Unity engine 107 (both gaming engines), and a web browser 109. In addition, the core may receive inputs from a display device and/or operating system on which a program or programs is (are) run. The core 101 is accessed through a web browser, a native Win32 or OSX app a C++ program, a graphics engine or a specialized processor, such as an R5 processor used in certain camera technology. The core 101 can also be run via other cores on remote computers connected locally or via the internet. The connections to the core 101 are clients of the core. Any clients connected to a core communicate instantly with one another. For example, if one user clicks a checkbox on their browser, the checkbox immediately appears on the screens of all other clients. In addition, if one user "drags" an icon in his/her screen, the icon will appear in the same way in the screens of all other users connected to the same core. The same is true for video streaming and simultaneous game play. A significant difference in systems of the invention is that it is not necessary to write walls of code to propagate changes throughout multiple users. Rather, it is only necessary to write small snippets of code in transport layers for each of the different types of clients (e.g., operating systems, phones, hand-held tablet computers, laptop computers, different programing languages, etc.) interacting with the core. Additional clients can be added to the same core without having to write new code. The core continuously runs and all that is necessary is to write a new transport layer to connect—in the new client.

A computing environment of the invention may comprise a graph structure, or multiple interconnected graph structures, the behavior of which is driven by data flow through interconnected nodes, independent of an external code base. The computer system may include a plurality of interconnected nodes in which data flow between the nodes drives execution of one or more functions and wherein code within the system is substantially, essentially, or fully restricted to said nodes, each of which performs a dedicated function and an engine to drive communication between said system and operating hardware. Data are injected into a node and the node responds by outputting a value (data) to one or more subsequent nodes. Those nodes, in turn, output a behavior that is dependent upon the value (data) they received from one or more other nodes. Thus, it is the data that drives operation of the graph and not a traditional code stack.

What is claimed is:

1. A computer system comprising:
  operating hardware comprising a central processing unit (CPU) coupled to memory having an engine and a core resident therein, wherein the system maintains a namespace within the core and wherein the engine is operable to read graph definitions and provide, within the core, a graph structure comprising a plurality of interconnected nodes in which data flow between the nodes drives execution of one or more functions and wherein code for the execution of the one or more functions is restricted to said nodes, each of which performs a dedicated function, wherein the graph structure is integrated with an operating system selected from the group consisting of iOS, Linux, Windows, or Android systems,
  wherein values that are placed in the namespace of the core are distributed to nodes listening to the core to thereby drive communication between said graph structure and the operating hardware, and
  wherein each node responds to received values by performing the dedicated function of that node and outputting a new value to a connected node, and
  wherein the graph structure is not substantially altered when moved from one operating system to another.

2. The computer system of claim 1, wherein said nodes are modular.

3. The computer system of claim 2, wherein connections between nodes are altered without a run stop.

4. The computer system of claim 2, wherein nodes are added to said graph structure without a run stop.

5. The computer system of claim 2, wherein nodes are removed from the structure without a run stop.

6. The computer system of claim 1, wherein said graph structure produces an historical record of either or both of (1) changes made to the structure over time, and (2) data values that have flowed through any of the nodes in the graph over time.

7. The computer system of claim 1, wherein said engine is specific for execution of functions in a computer environment in which the graph structure is integrated.

8. The computer system of claim 1, further comprising nodes that are compatible across a plurality of operating systems.

9. The computer system of claim 1, wherein threads of execution are created on demand as a consequence of data flow through nodes.

10. A computer system comprising:
  operating hardware comprising a central processing unit (CPU) coupled to memory having an engine and a core resident therein, wherein the system maintains a namespace within the core and wherein the engine is operable to read graph definitions and provide, within the core, a graph structure having interconnected nodes, wherein said nodes comprise code and wherein the graph structure is integrated with an operating system selected from the group consisting of iOS, Linux, Windows, or Android systems and wherein the system drives execution of one or more functions via execution of the code within the nodes regardless of the operating system with which it is integrated, wherein
  values that are placed in the namespace of the core are distributed as input to nodes that are listening to the core,
  the nodes that are listing to the core process the input, and
  each node processes input values by performing a dedicated function of that node to send an output value to at least one subsequent node connected to that node within the graph structure, and wherein the graph structure is not substantially altered when moved from on operating system to another.

11. The computer system of claim 10, wherein said system is transferred between operating systems without changing logic represented by the graph structure.

12. The computer system of claim 11, wherein said system is integrated with driver software compatible with the operating system into which said graph structure is integrated.

* * * * *